March 26, 1940.  S. N. BARUCH  2,194,966
POWER TRANSLATING SYSTEM
Original Filed Oct. 16, 1931
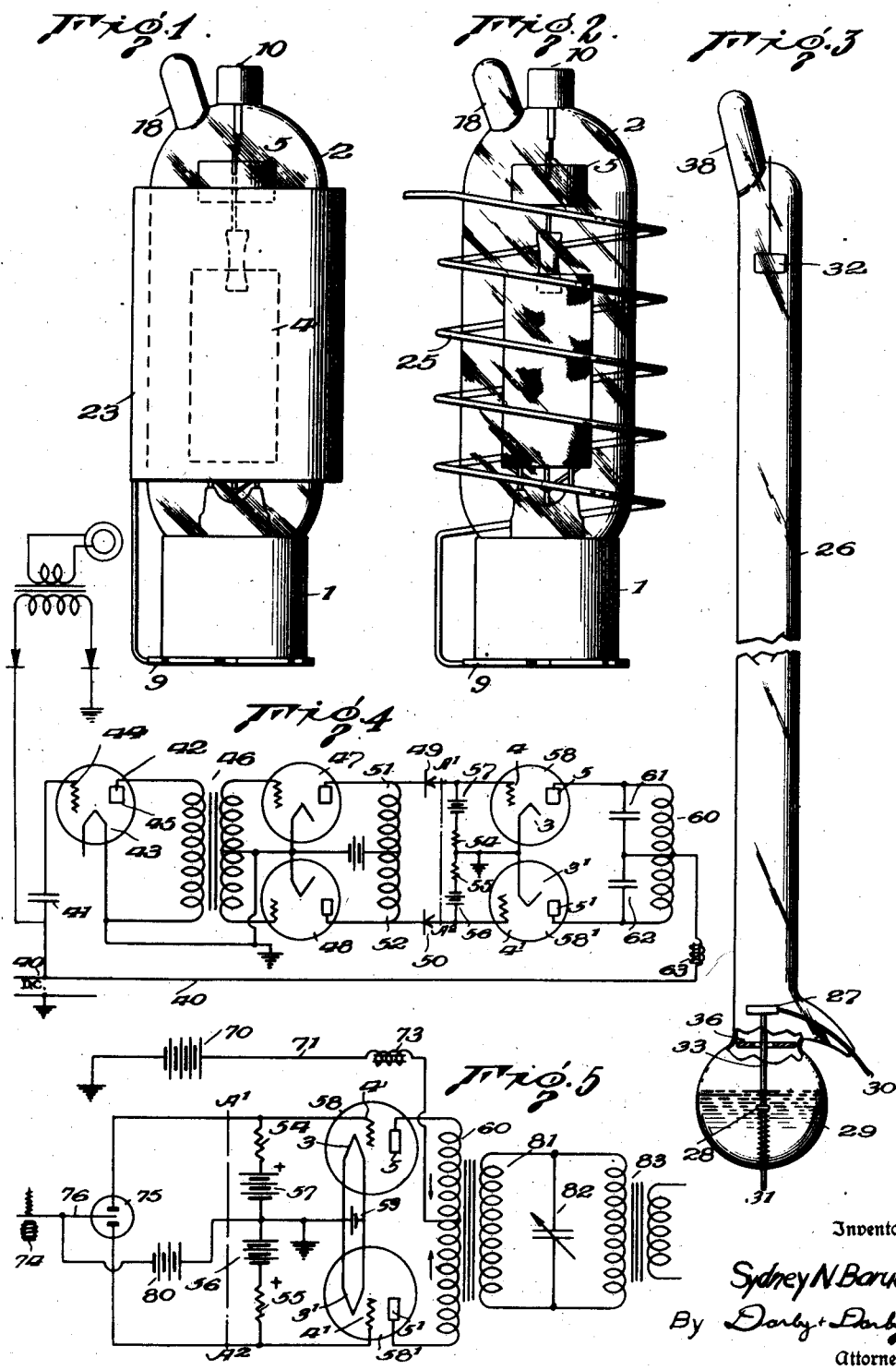
Inventor
Sydney N Baruch
By Darby & Darby
Attorneys Patented Mar. 26, 1940

2,194,966

UNITED STATES PATENT OFFICE 2,194,966

POWER TRANSLATING SYSTEM

Sydney N. Baruch, New York, N. Y., assignor to Nortron Patents Corporation, New York, N. Y., a corporation of New York Original application October 16, 1931, Serial No. 567,735. Divided and this application January 22, 1938, Serial No. 186,276

6 Claims. (Cl. 171—97)

This invention relates to electrical translating systems and to particular means for effecting said translation in a highly efficient manner.

This application is a division of my copending application Serial No. 567,735 filed October 16, 1931, now Patent No. 2,113,392, issued April 5, 1938. While both applications disclose an electronic relay together with circuits for use therewith in a high tension power translating system the earlier application is concerned primarily with the relay construction whereas the instant application is concerned primarily with and claims only power translating system circuits incorporating electronic relays which may be of the construction disclosed.

It is an object of my invention to provide an improved electron emitting relay or control switch which is capable of many applications. More particularly this switch is adapted to control high voltages which renders the same practicable for the transformation of high voltage direct current energy to alternating current energy.

It is a further object of my invention to make possible the conversion of A. C. energy to D. C. energy for transmission purposes and to translate the D. C. energy back to A. C. energy at a distant point. In one form of my invention, I utilize the ripples caused by the original rectification of the energy to synchronize the A. C. energy obtained at the final point of consumption. I furthermore provide that alternating current of any frequency may be obtained irrespective of the original frequency of the A. C. energy before rectification.

It is a further object of my invention to present a new form of mercury vapor arc rectifier which is specially adapted to rectify high voltages as is contemplated in the system of my designs.

It is a further object of my invention to provide an electronic relay which is adapted to be controlled by the grid to perform its many functions. The control exercised by this relay may be such as to give rise to a square shaped alternating wave, resulting in a minimum of heat losses and thereby a maximum of efficiency.

Another object of my invention is to provide a resonant circuit for converting the square wave form output of the electronic relay system to a sinusoidal wave form adapted to be impressed upon commercial alternating circuit transmission and distribution systems.

My invention will be better understood from the following description taken in connection with the accompanying drawing, and its scope will be pointed out in the appended claims.

Fig. 1 is a front elevation of my electron relay with an additional control grid cylinder upon its exterior;

Fig. 2 is a modification of Fig. 1 having a coil of wire as a supplementary control grid;

Fig. 3 is a front elevation of a mercury arc rectifier particularly adapted for application in my system;

Fig. 4 is a circuit diagram embodying my electron relay;

Fig. 5 is another circuit diagram embodying my electron relay wherein high voltage D. C. energy is transformed to A. C. energy.

My improved electronic relay finds a special application in the translation of energy. Fig. 4 shows the electronic relays associated in a system wherein the high voltage power of a direct current energy line is used to synchronize the power at an ultimate point of consumption whereat the direct current energy is inverted to alternating current energy of the same frequency as the generated power at the source. The specific features of this control will be explained hereinafter. Fig. 5 shows the electronic switches associated in an energy converting system wherein the frequency of alternating current energy output is independent of the frequency of the original power.

In Fig. 5, 70 may represent the high direct current potential on a transmission line 71. The stages of energy conversion resulting in this high direct current potential does not constitute a feature of my invention and is therefore not illustrated. Normally the output of a high powered alternating current generator is passed through a power transformer to step up its voltage. This alternating current energy of high potential is then rectified and impressed upon the transmission lines. Such rectifiers as are illustrated and explained in conjunction with Fig. 3 are particularly suited for this purpose.

The transmission of the direct current energy results in the elimination of corona losses, which attends high voltage alternating current energy transmission. The electron relays of the type disclosed above are represented by 58 and 58', each having the respective cathode, grid, and anode elements 3, 3', 4, 4' and 5, 5'. The anodes are energized by the high direct current potential through the two halves of the primary winding 60. The filaments are suitably heated by energy source 59. A potential source 80, of a reduced range from that of 70, which may be derived from the power line by a potentiometer connection, serves to impose a negative blocking potential alternately upon the grids of the tubes 58 and 58'. This potential is alternately imposed by the vibrating contact 76, which is actuated by relay 74 at any desired frequency, which may be 60 cycles if such an inversion is desired. The armature 76 cooperates with two contacts in an evacuated bulb to obtain a clear and distinct action. The make and break device may assume the form of any chopper or commutator, the speed of which or the number of segments of which may be chosen for each specific application.

As will be seen the speed and number of segments of the chopper device or the rate of vibration of the relay may be such as to produce any desired frequency, as for example the common commercial frequency of 60 cycles per second.

In the past various suggestions of means for transmitting direct current power and connecting such direct to alternating current prior to distribution have been made. These suggestions, so far as is known, were not practical nor, in fact, operable. One suggestion for example, contemplated the control of the frequency of the alternating current output by controlling the frequency of alternating current supply to the filaments of magnetron tubes the plates of which were in the conversion circuit. Due to the thermal lag of the filaments this arrangement is not operable at commercial frequencies and in fact probably not operable at frequencies exceeding five or six cycles per second.

Biasing batteries 57, 56 connected to relays 58 and 58' respectively through resistors 54 and 55 render the relays normally conducting. Connection with potential source 80 serves to block the tubes alternately. The cut-off action thus obtained is a sharp one resulting in the transference of an alternating wave form of square shape from the primary coil 60. Choke coil 73 excludes the alternating current energy from the direct current energy line. A square wave form results in a high efficiency since no heat is wasted in the electron relay system. The output circuit coupled to primary coil 60 is tuned to resonance by means of variable condenser 80 to the natural frequency at which relay 74 is operating. This tuned circuit serves to modify the alternating current wave into a sinusoidal form.

The tuned, resonant circuit is essential since without it the voltage in coil 81 would be a surging one, rising to extreme values as the current commenced to flow in coil 60, immediately decreasing to substantially zero, again rising to an extreme value as the current ceased to flow in the half-winding considered again decreasing immediately to zero, again rising to an extreme value, opposite in polarity, as current commenced to flow in the other half of the winding and again immediately decreasing to zero as the current reached its steady state. This would continue, surges of extreme voltage occurring at the beginning and end of each square topped wave, as long as the system was in operation.

As is obvious, when a proper resonant circuit is utilized, the interchange of current causes the square topped wave to be converted to a sinusoidal wave suitable for operation of commercial alternating current apparatus.

Thus an iron core transformer may be inserted into the system at a point where the sine wave current flows to reduce the alternating current energy to a lower potential. My tubes are practical for extremely high capacities and potentials.

Referring to Fig. 4 condenser 41 is connected to the high potential direct current line 40. The ripples which are present to a small degree in the continuous current energy are by-passed by this condenser. An amplifier 42 comprising cathode 43, grid 44, and anode 45, amplifies these ripples and they are then passed through a push pull amplifying system 47, 48. The output from this amplifying system, impressed across coils 51, 52, are rectified by rectifiers 49, 50, which may be of a type well known in the art. The connection beyond line A, A2, is the same as the corresponding showing in Fig. 5 with the exception that high voltage condensers 61 and 62 are utilized to obtain a smooth sinusoidal wave of the operating frequency. The action of the tubes 58 and 58' is similar to that described in conjunction with Fig. 9, although the alternating blocking action exercised through rectifiers 49 and 50 does not give the sharp cut-off action which the corresponding relay 75 in Fig. 5 does. Choke coil 63 blocks the alternating current energy from the direct current energy line.

My invention is capable of other applications. Several other modifications of the embodiments of my invention may be made; but no limitations upon the invention are intended, other than those imposed by the scope of the appended claims.

Having described my invention, what I claim is:

1. The method of power transmission comprising the generating of alternating current energy at frequencies below 120 cycles per second, transforming said alternating current energy to a high voltage of the same frequency, rectifying said energy, transmitting the resulting high voltage direct current energy, energizing an electronic interrupter system with said high voltage direct current energy and converting said high voltage direct current energy into alternating current energy by means of said electronic system.

2. The method embodied in claim 1 wherein the wave form of the alternating current energy last obtained, is rendered sinusoidal by means of an electrical storage network.

3. In a high voltage direct current transmission system, two electronic interrupters arranged in opposed relationship each comprising an electron emitting cathode, a control grid and an anode, means for continuously applying said high voltage to the anodes of said interrupters, means for alternately and intermittently applying a lesser negative voltage to the grids of said interrupters, means for applying fixed positive potentials to said grids, output inductances associated with said anodes and so connected to have imposed upon them an alternating current, and a resonant impaction network.

4. The method of transmitting power as direct current which comprises generating alternating current energy at the source, the raising of the voltage of said alternating current energy at said source, substantially rectifying said energy, bypassing the ripples of the rectified energy at the remote point, amplifying said ripples and controlling the conductivity of two opposed electronic interrupters by the alternations resulting from said ripples to synchronize the alternating current produced at said remote point with that at said source.

5. In a direct current energy translation system a condenser connected to the direct current energy line to by-pass the ripples present in said direct current energy, a thermionic amplifier for said ripples, push pull amplifiers coupled to said first mentioned amplifier, rectifiers connected to said push pull amplifiers, two electron interrupters arranged in opposed relationship each comprising an electron emitting cathode, a control grid and a plate, means for continually energizing said plates by said direct current energy, said grids being connected to said rectifiers and adapted to be alternately controlled to render the respective tubes conducting.

6. The method of power transmission comprising the generating of alternating current energy of a frequency below 120 cycles per second, transforming said alternating current energy to a high voltage of the same frequency, rectifying said energy, transmitting the resulting high voltage direct current energy, energizing an electronic interrupter system with said high voltage direct current energy and converting said high voltage direct current energy into alternating current energy of a frequency different from said first mentioned frequency by means of said electronic system, said electronic system being controlled and supplied with power by means independent of the transmitted current.

SYDNEY N. BARUCH.